(No Model.)
E. T. & F. S. MATHEWS.
COUPLING FOR WATER CLOSET HOPPERS AND PIPES.
No. 432,318. Patented July 15, 1890.
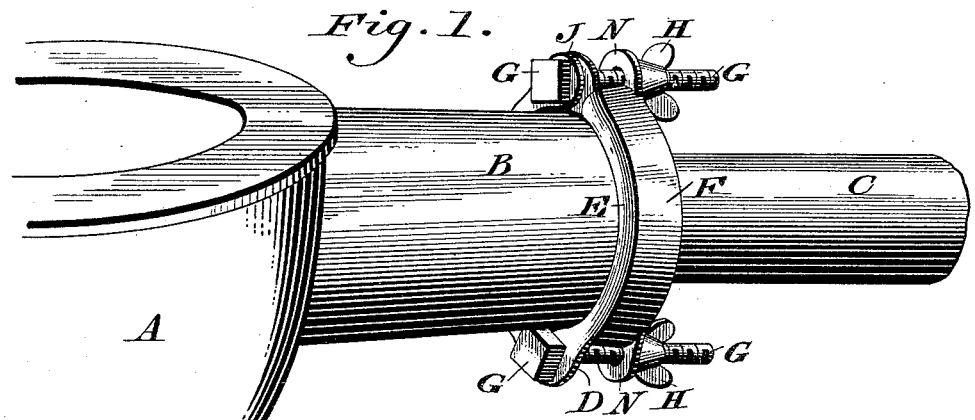
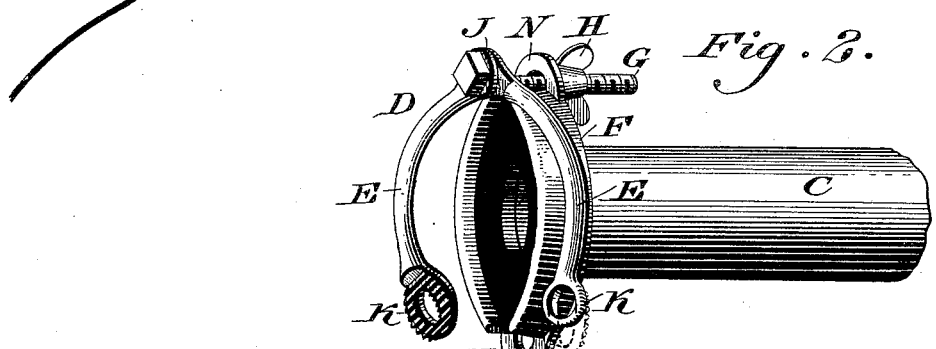
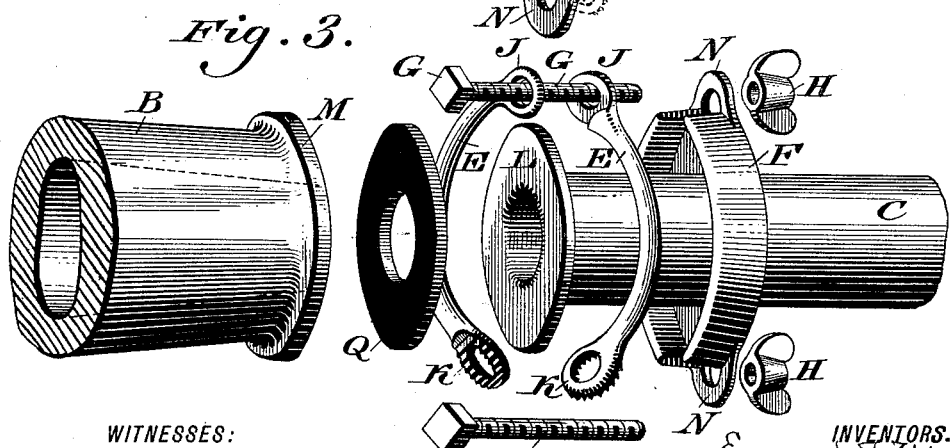
WITNESSES:
P. H. Nagle.
L. Douville.
INVENTORS.
Edward T. Mathews
Frank S. Mathews
BY
ATTORNEY.

UNITED STATES PATENT OFFICE.

EDWARD T. MATHEWS AND FRANK S. MATHEWS, OF PHILADELPHIA, PENNSYLVANIA.

COUPLING FOR WATER-CLOSET HOPPERS AND PIPES.

SPECIFICATION forming part of Letters Patent No. 432,318, dated July 15, 1890.

Application filed January 24, 1890. Serial No. 338,012. (No model.)

*To all whom it may concern:*

Be it known that we, EDWARD T. MATHEWS and FRANK S. MATHEWS, citizens of the United States, both residing in the city and county of Philadelphia, State of Pennsylvania, have invented a new and useful Improvement in Couplings for Water-Closet Hoppers and Pipes, which improvement is fully set forth in the following specification and accompanying drawings.

Our invention consists of a coupling for water-closet hoppers and pipes formed of a cap, a divided ring, and screws or bolts connecting said cap and ring, the cap, the pipe, and the ring embracing the branch of the hopper, thus providing a convenient and reliable device for the purpose intended, it being evident that the invention is serviceable for coupling-pipes for other purposes than water-closets or water-closet hoppers.

Figure 1 represents a perspective view of a coupling embodying our invention. Figs. 2 and 3 represent perspective views of the same, the parts being separated.

Similar letters of reference indicate corresponding parts in the several figures.

Referring to the drawings, A designates a portion of a water-closet hopper, and B the branch thereof.

C designates a pipe which is connected with the branch B, said parts being in general respects of ordinary construction.

D designates a coupling for connecting the pipe C with the branch or pipe B, the same consisting of a divided ring E, the cap F, the bolts or screws G, and nuts H. The ends of the sections or segments comprising the divided ring E are formed with eyes J J and K K, the bolts G passing through said eyes, thus connecting the opposite ends of the sections. The inner end of the pipe C is enlarged or formed with a head or shoulder L, and the outer end of the branch B is also enlarged or formed with a shoulder or head M. The cap F embraces the inner end of the pipe C and the divided ring E embraces the outer end of the branch B.

When the pipe C is to be connected with the branch B, the cap F is fitted over the pipe C and the latter moved toward the branch B. The ring E is fitted around the branch B and the bolts or screws G passed through the eyes J K and ears N on the periphery of the cap F, a suitable packing or gasket Q being interposed between the heads or shoulders L M of the pipe and branch, it being seen that the ends of the pipe and branch are within the cap F. The nuts H are now rotated, whereby the ring E and cap F are moved toward each other, whereby the pipe C is firmly pressed against packing and consequently against the end of the branch, thus reliably coupling the parts and producing a tight joint between the same.

In order to provide for inequalities of the periphery of the branch, one of the eyes K of the sections of the ring is of the form of a slot; but, if desired, the other eye may thus be constituted, as shown by the dotted lines, Fig. 2, whereby the ring may be expanded or contracted.

In order to prevent slipping of the eye portions of the sections of the ring, the contiguous walls of the same are serrated, so that said portions may be locked.

Should it be desired to disconnect the pipe C from the hopper, either of the bolts or screws G is removed, whereby the sections of the ring may be opened and withdrawn from the branch, after which the pipe C may be moved from said branch and readily separated therefrom, it being evident that the coupling and uncoupling of the pipe and branch may be accomplished in a convenient manner, and the coupling is constructed of few parts in a strong and inexpensive manner.

Having thus described our invention, what we claim as new, and desire to secure by Letters Patent, is—

1. In a coupling for a water-closet hopper and pipe, a pipe-section B, having a flanged end M, a pipe-section C, having a flange L at the end thereof, a non-screw-threaded recessed cap F, loosely movable endwise on section C and adapted to exteriorly embrace and cover the flanged ends of sections B and C and provided with eyes, a split ring adapted to be mounted on section B against the flange M, and having eyes, and removable bolts or screws connecting said caps and ring, substantially as described.

2. In a coupling for a water-closet hopper and pipe, a pipe-section B, having an enlarged end or shoulder, a pipe-section C, having a flange L at one end, a gasket Q, interposed between the enlarged end of section B and the flange of section C, a non-screw-threaded flanged cap F, having eyes and loosely movable endwise on the section C and exteriorly embracing and inclosing the flange of section C and enlarged end of section B, together with said gasket, a ring constructed of independent separable parts having their ends recessed to form a lap and terminating in eyes, and removable bolts or screws passing through the eyes in said cap and ring to detachably connect the parts, substantially as described.

EDWARD T. MATHEWS.
FRANK S. MATHEWS.

Witnesses:
JOHN A. WIEDERSHEIM,
L. JENNINGS.